United States Patent
Wu et al.

(10) Patent No.: US 7,289,264 B2
(45) Date of Patent: Oct. 30, 2007

(54) PASSIVE BROAD LONG WAVE AND MID-WAVE INFRARED OPTICAL LIMITING PRISM

(75) Inventors: Pingfan Wu, Niskayuna, NY (US); George Dalakos, Niskayuna, NY (US); Brian Lawrence, Clifton Park, NY (US); Peter Lorraine, Niskayuna, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 145 days.

(21) Appl. No.: 11/012,106

(22) Filed: Dec. 16, 2004

(65) Prior Publication Data

US 2006/0132905 A1    Jun. 22, 2006

(51) Int. Cl.
*F21V 9/04* (2006.01)
*G02B 5/08* (2006.01)

(52) U.S. Cl. .............. 359/359; 359/350; 359/577; 359/589

(58) Field of Classification Search ........ 359/350–361, 359/557–590, 831–838
See application file for complete search history.

(56) References Cited

U.S. PATENT DOCUMENTS

| | | | |
|---|---|---|---|
| 4,249,796 A * | 2/1981 | Sincerbox et al. ........... 359/241 |
| 4,565,422 A * | 1/1986 | Seymour et al. ............. 385/36 |
| 4,768,864 A * | 9/1988 | Wu et al. .................... 349/197 |
| 5,018,942 A * | 5/1991 | Ciokajlo et al. .......... 415/173.2 |
| 5,339,441 A * | 8/1994 | Kardos et al. ............... 359/352 |
| 5,347,395 A | 9/1994 | Lautenschlager et al. |
| 5,434,411 A * | 7/1995 | Miyahara et al. ...... 250/339.07 |
| 5,589,101 A | 12/1996 | Khoo |
| 5,796,107 A * | 8/1998 | Buchtemann et al. ........ 250/351 |
| 5,912,762 A * | 6/1999 | Li et al. ...................... 359/352 |
| 6,392,233 B1 | 5/2002 | Channin et al. |
| 6,721,057 B1 * | 4/2004 | Reininger ................... 356/520 |

OTHER PUBLICATIONS

Perazzo et al., "Infrared vision using uncooled micro-optomechanical camera," *Applied Physics Letters*, vol. 74, No. 23, Jun. 7, 1999, pp. 3567-3569.

Danilov, et al., "Effect of intense laser radiation on controlled VO2 mirrors," *J. Opt. Technol.*, vol. 67, Jun. 2000, pp. 526-531.

(Continued)

*Primary Examiner*—Thong Q Nguyen
(74) *Attorney, Agent, or Firm*—Birch, Stewart, Kolasch & Birch, LLP

(57) ABSTRACT

Method for limiting the amount of radiation impinging on a radiation sensitive detector (RSD) responsive to signals having infrared wavelengths of approximately 3 to 14 microns. Method includes: directing radiation signal through prism toward RSD; permitting radiation signal to impinge upon RSD when radiation is below predetermined threshold; and directing radiation associated with radiation signal but of different wavelengths from signals of interest on path external to prism, to initiate limiting of radiation impinging upon RSD when predetermined threshold is exceeded. Also, Total Internal Reflection device including prism having thin film coated on back surface of prism. Material making up prism and thin film are selected so that, in presence of radiation having intensity less than certain threshold, refractive index of thin film is lower than that of prism, and when radiation has intensity higher than that certain threshold, refractive index of thin film is higher than that of prism.

15 Claims, 2 Drawing Sheets

OTHER PUBLICATIONS

Segaud, et al., "VO2 and Au-VO2 thin films prepared by sputtering and sol-gel for infrared optical power limiting," *Nonlinear Optics*, 1999, vol. 21, pp. 211-224.

Mikheeva et al., "Features of the limitation of laser radiation by mirrors based on vanadium dioxide" J. Opt. Technol. 68 (4), Apr. 2001, pp. 278-281.

Oden et al., "Uncooled thermal imaging using a piezoresistive microcantilever," *Appl. Phys. Lett.* 69 (21) Nov. 18, 1996, pp. 3277-3279.

Manalis, et al., "Two-dimensional micromechanical bimorph arrays for detection of thermal radiation," *Appl. Phys. Lett.* 70 (24), Jun. 16, 1997, pp. 3311-3313.

De Natale, J.F., "Thin film optical switching materials," *Mat. Res. Soc. Symp. Proc.*, vol. 374, Materials Research Society, C1995, pp. 87-97.

Konovalova, et al., Interference systems of controllable mirrors based on vanadium dioxide for the spectral range 0.6-10.6 μm, *J. Opt. Technol.*, 66 (5), May 1999, pp. 391-398.

Suh, et al., "Semiconductor to metal phase transition in the nucleation and growth of VO2 nanoparticles and thin films," *J. Applied Physics*, vol. 96 (2), Jul. 15, 2004, pp. 1209-1213.

LoPresti, et al., "All-Optical Switching of Infrared Optical Radiation Using Isotropic Liquid Crystal," *IEEE Journal of Quantum Electronics*, vol. 31, No. 4, Apr. 1995, pp. 723-728.

* cited by examiner

PASSIVE BROAD LONG WAVE AND MID-WAVE INFRARED OPTICAL LIMITING PRISM

FIELD OF THE INVENTION

This invention provides a passive optical limiting device for Long Wave Infrared Radiation ("LWIR", approximately 7 to 14 microns wavelength) detector protection. This invention can also provide protection in the mid-IR region (approximately 3 to 5 microns wavelength). The LWIR and mid-IR limiters of this invention each includes a Total Internal Reflection (TIR) device in which a thin film is coated on the back surface of a prism. The refractive index of the thin film changes as the thin film absorbs radiation. For example, without the radiation, the refractive index of the thin film is lower than that of the prism, providing TIR. While the device operates in TIR mode, the signal is reflected to a detector. When the radiation becomes stronger than a certain threshold, the refractive index of the thin film becomes higher than that of the prism. At this point, the TIR condition is broken, and the signal is no longer reflected to the detector.

BACKGROUND OF THE INVENTION

This invention provides an optical power-limiting device in the LWIR region. Optical limiters are used to protect eyes, photodetectors, or cameras against unexpected strong illumination. An ideal optical limiter is transparent under low level of illumination at the wavelength of interest but "dark" under strong incident light power. The optical signal power transmitted through an optical limiter is ideally constant, no matter what the incident power is. An optical limiter should also have a low initiating threshold and a broad spectral range.

Interesting results in optical limiting have been obtained for Reverse Saturable Absorber (RSA) solutions and multi-photon absorber dyes. Such materials absorb more light as the intensity of the incident light increases. A disadvantage of such materials arises from their use of nonlinear optical absorption processes. This leads to a high threshold for the optical limiting behavior to switch on. More importantly, unlike the present invention, conventional RSA or multi-photon solutions cannot be used in the LWIR region.

U.S. Pat. No. 5,347,395 ("the '395 patent") discloses an optical power limiting device whose transmissibility within a wave length range of interest is a function of the intensity of the incident radiation. The device utilizes detuning of the resonance of surface plasmons. The device of the '395 patent is said to be particularly suitable for the protection of IR detectors against incidence of high radiation intensities. However, the device of the '395 patent employs multiple layer interference, which has a relatively short bandwidth. The patent teaches in columns 4-5 that "the active layer" may be quartz, $Al_2O_3$, BeO, or AlN and that "the dispersion layer", which is the index-changing material in the '395 patent, may be $VO_2$.

In contrast to system described in the '395 patent, the device of the present invention works for a broad bandwidth, all the way from 7 to 14 microns. The device of the present invention is designed for use in continuous wave operation, such as sunlight, which is subject to relatively low peak intensity, unlike for instance lasers, which have very high peak intensities. The device of the '395 patent uses the signal itself to heat the index-changing material. In the present invention, the LWIR signal (7-14 µm wavelength) is the signal of interest and it is not absorbed by the index-changing material. Instead, in the present invention, the signal of interest is separated from radiation of other wavelengths in the incoming sunlight or other radiation. In this invention, visible and near-IR components of sunlight are utilized to heat the index-changing material.

A copending U.S. patent application Ser. No. 11/012,138 by Wu, Delakos, Lawrence, Lorraine, and Yenisch, entitled "Passive Broadband Long Wave and Mid-Wave Infrared Optical Limiter Device", filed concurrently herewith, discloses an optical limiter that involves a transmission-type $VO_2$-based thin film design. Since IR-transmitting materials usually have a high refractive index, Fresnel losses through the materials is higher than 10%, unless the materials are coated with Anti-Refraction material ("AR-coated"). The present invention provides a reflection type IR limiter design which can reflect up to 99% of the broadband radiation signal at normal state. The entire disclosure of this copending application is expressly incorporated herein by reference.

SUMMARY OF THE INVENTION

Disclosed herein is a method for limiting the amount of radiation impinging on a radiation sensitive detector that is responsive to signals of interest having infrared wavelengths of approximately 3 to 14 microns. This method includes the steps of: directing a radiation signal through a prism and toward the radiation sensitive detector; permitting the radiation signal to impinge upon the radiation sensitive detector when the radiation is below a predetermined threshold; and directing radiation associated with the radiation signal but having wavelengths different from the signals of interest— e.g., wavelengths in the visible and near-infrared range—on a path external to the prism, in order to initiate the limiting of the radiation impinging upon the radiation sensitive detector when the predetermined threshold is exceeded.

In a more specific embodiment, this application discloses: exposing an infrared camera to a source of infrared radiation and to ambient sunlight; permitting the infrared radiation to pass through a prism and to impinge upon an infrared focal plane array within the camera when the heat generated by the infrared radiation and the ambient sunlight is no greater than 1 $W/cm^2$; and, when the heat generated by the infrared radiation and the ambient sunlight exceeds 1 $W/cm^2$, utilizing that heat to change the state of a material located on the prism in the path of the infrared radiation from a semiconductor phase to a metal phase, thereby attenuating transmission of the infrared radiation to the infrared focal plane array in the camera. In this embodiment, the infrared radiation is permitted to impinge upon the infrared focal plane array by an IR limiting layer made of a material that can change from a semiconductor phase to a metal phase upon heating. Typical of such materials are vanadium dioxide, vanadium sesquioxide, and germanium crystal. In one variant of this embodiment of the present invention, the signal of interest may have infrared wavelengths of approximately 7 to 14 microns and the radiation used to initiate limiting of the radiation impinging upon the radiation-sensitive detector may include radiation having wavelengths in the range 3 to 5 microns.

Another embodiment of the present invention is a mid-wave infrared radiation (mid-IR) and long wave infrared radiation (LWIR) limiter total internal reflection (TIR) device. The device includes a prism having a thin film coated on the back surface of the prism. The material making up the prism and the thin film are selected so that, in the presence of radiation having an intensity less than a certain threshold, the refractive index of the thin film is lower than that of the prism, and when the radiation has an intensity higher than that certain threshold, the refractive index of the thin film is higher than that of the prism. Typical prism material/thin film material pairings for this embodiment include gallium arsenide (GeAs) or germanium (Ge) prisms and vanadium dioxide thin films. In this TIR device, radiation of the desired wavelength may be separated from radiation of other wavelengths by a broadband interference filter (or "beam splitter"), which may be constituted by layers of thorium fluoride (ThF$_4$) and zinc selenide (ZnSe). The device may also include means, such as imaging optics, to image the radiation of other wavelengths to the back side of the prism for heating the thin film from the back side of the prism.

A similar embodiment of this invention is a mid-IR and LWIR limiter TIR device that involves a prism having a thin film coated on its back surface, with the material making up the prism and the thin film in this device being selected so that, in the presence of radiation having an intensity less than a certain threshold, the refractive index of the thin film is higher than that of the prism, and when the radiation has an intensity higher that that certain threshold, the refractive index of the thin film is lower than that of the prism.

BRIEF DESCRIPTION OF THE DRAWINGS

The present invention will be more fully understood from the detailed description given hereinafter and from the accompanying drawings. The drawings are not to scale, and are presented for illustrative purposes only. Thus the drawings are not intended to limit the present invention.

DETAILED DESCRIPTION OF THE INVENTION

Many materials experience a refractive index change as they absorb radiation or as their temperature changes. Such materials include vanadium dioxide (VO$_2$), whose refractive index at 10.6-micron wavelength changes from 2.55-0.08i to 8-9i when it switches from the semiconductor phase to the metal phase at 68° C.

Other examples of such materials include nonlinear refractive liquid crystals, whose refractive index changes as $dn=n2*I$, where dn is the variation of the refraction index, I is the intensity of light radiation, and n2 is the nonlinear coefficient, which has been reported to be up to $10^{-4}$ cm$^2$/Watt. Liquid crystals suitable for use in the present invention are disclosed by Khoo in U.S. Pat. No. 5,589,101, the entire disclosure of which patent is hereby expressly incorporated by reference.

Figure 1:
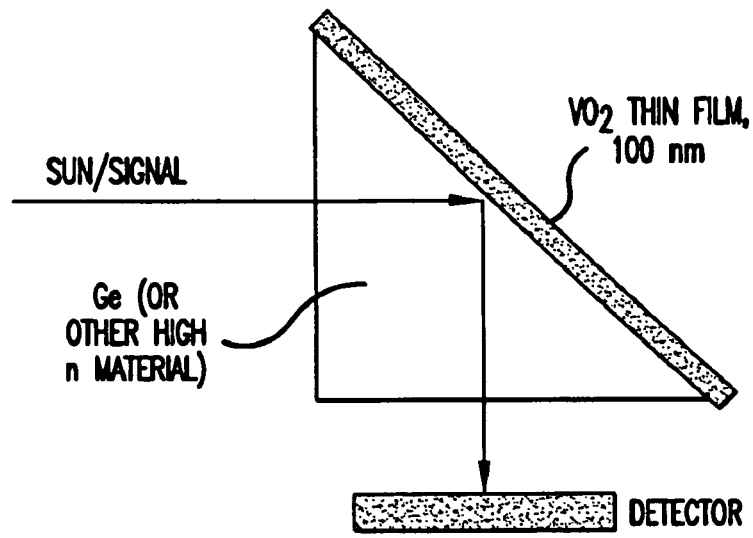
FIG. 1 is a schematic cross-sectional illustration of a vanadium dioxide-coated prism unit in accordance with the present invention.

In accordance with the present invention, a thin film (about 10 to 1000 nanometers in thickness) of one of these refraction-index-varying materials is coated onto on the back surface of a prism. The prism may be, e.g., a 90-degree prism, and multibandwidth continuous light, e.g., sunlight, may be directed at the back surface of the prism at an angle of incidence of, e.g., 45 degrees. This is illustrated in FIG. 1.

The vanadium dioxide layer can be coated onto the prism in the present invention by a two-step procedure: pulsed laser deposition (PLD) of a substoichiometric vanadium oxide, followed by annealing to create VO$_2$. The vanadium dioxide layer is deposited on the substrate. The pulsed laser deposition is carried out in a commercial PLD chamber (for instance, an Epion PLD 3000). In a typical PLD procedure, the beam from a KrF excimer laser at a wavelength of 248 nm with 25 Hz pulse rate is focused onto a pure vanadium target at a fluence of approximately 4 mJ/cm$^2$. The beam energy is controlled by splitting off a very small fraction of the laser beam prior to entering the PLD chamber and using it for feedback through the control of the PLD system. The number of laser pulses required to deposit a typical thickness of 100 nm of oxide on the substrate is on the order of $5\times10^4$. Laser rastering and the distance between the rotating target and the substrate are adjusted so that the ablation plume covers the substrate uniformly. A typical target-substrate distance is 7 cm. This procedure is conducted at room temperature. The background vacuum level before introducing oxygen is maintained under $3\times10^{-6}$ Torr. The PLD-deposited film is subsequently annealed. A typical oxygen pressure in the deposition and annealing processes is 5 mTorr.

The refractive index of the prism material is chosen to be higher than that of the thin film at normal state, but lower than that of the thin film after switching. The detector is generally located at a 90 degree angle with respect to the incident light. A typical detector that can be protected in accordance with this invention is an IR focal plane array detector.

At normal state, since the prism has higher refractive index than the thin film, a Total Internal Reflection (TIR) condition exists, with up to 99% of the signal being reflected to the detector. The thin film absorbs radiation. Those skilled in the art can readily adjust the thickness of the thin film to provide the desired degree of radiation absorption. When the radiation is higher than a certain threshold, the thin film changes its phase and has higher refractive index than the prism base material. At this point, the TIR condition is broken, and the light will be transmitted through the thin film. The detector is thus protected from the high intensity radiation.

Figure 2:
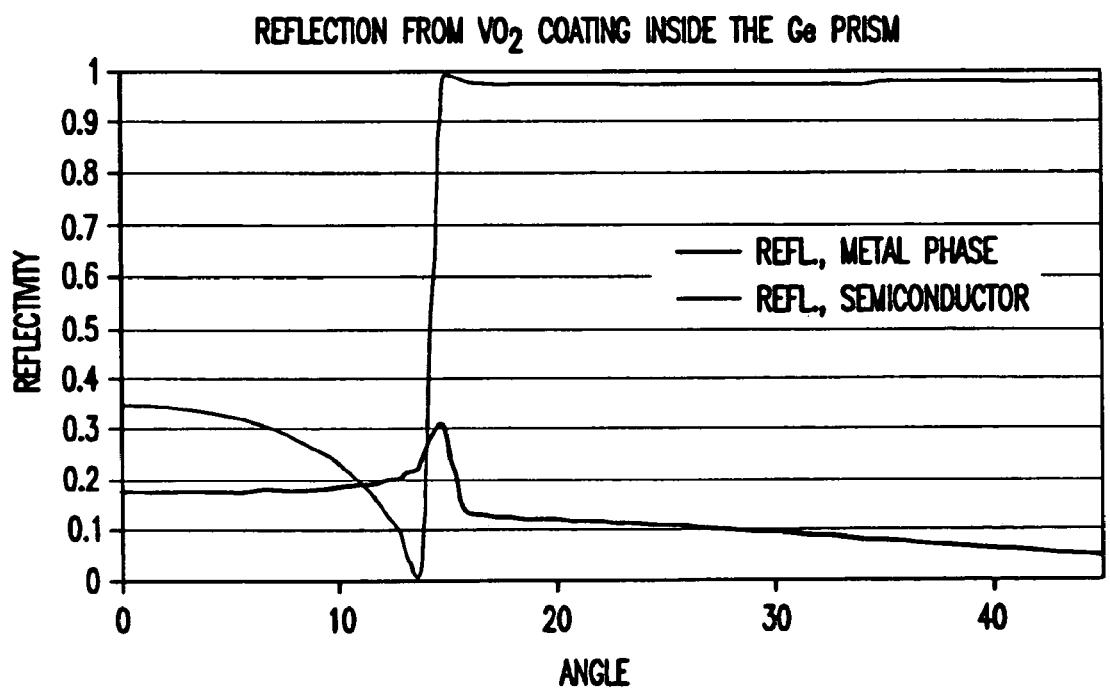
FIG. 2 is a graphical depiction of reflection in a prism such as that of FIG. 1 when the VO$_2$ film is in its semiconductor phase and when the VO$_2$ film is in its metal phase.

FIG. 2 shows the simulation of reflection from one such TIR prism. Germanium is the base material of the prism, which is coated by a 100 nm-thick VO$_2$ film on the back surface. When VO$_2$ is in its semiconductor phase at room temperature, the reflection from the Ge—VO$_2$ interface is as high as 99%. When the VO$_2$ thin film is heated to over 68° C., the VO$_2$ changes to its metal phase, and the reflection from the Ge—VO$_2$ interface can be as low as 5%.

The radiation that causes the VO$_2$ thin film on the prism to change refractive index can in principle be either from the signal of interest, at wavelength 7 to 14 microns (LWIR), or from other wavelengths. For sunlight or other radiation, the peak power is in the near IR region and can heat the thin film more effectively than can radiation in the LWIR region. Because of its high temperature and brightness, continuous wave radiation such as sunlight can be more harmful to a detector such as a camera than a pulsed narrow bandwidth laser would be. On the other hand, because of its high temperature, the continuous wave radiation has hundreds of times more energy in the visible and near infrared spectrum than in the long wave infrared region. The present invention makes use of the energy from visible and near infrared radiation to heat and trigger the optical limiting function of the present optical limiter prisms.

Figure 3:
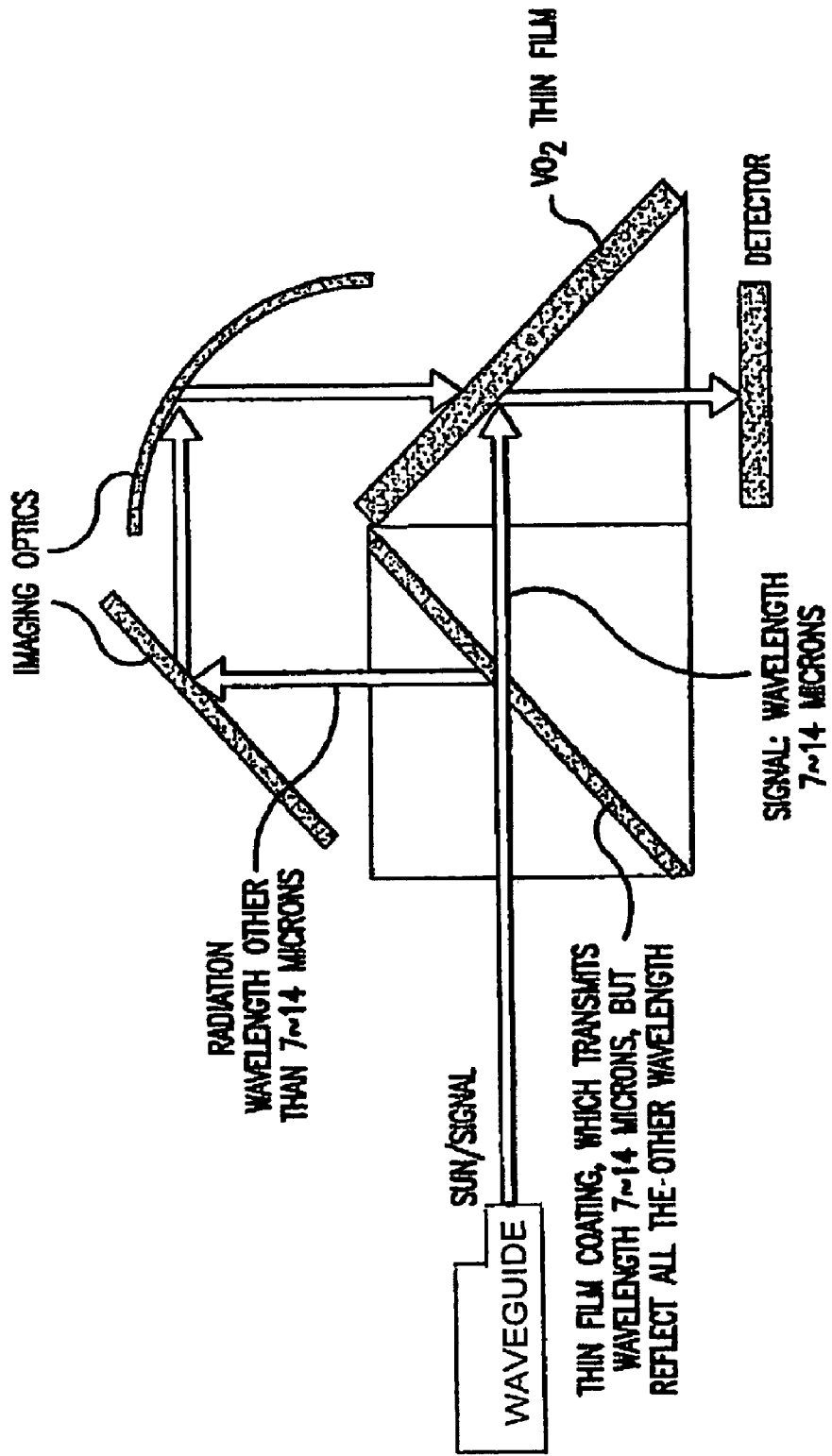
FIG. 3 is a schematic cross-sectional illustration of an optical limiting prism assembly of the present invention.

The heating of the thin film can be done either by radiation that goes through the same route as the signal or by radiation that is directed to the back of the prism. FIG. 3 shows a prism assembly in accordance with the present invention, in which three prisms are arranged contiguously to one another in the manner shown. In FIG. 3, the front surface of the middle prism has a coating that transmits a signal of interest (which has wavelength in the region of 7~14 microns) but which reflects radiation of all other wavelengths. Such coatings act as broadband interference filters. One example of such a coating is a multiple layer interference filter made from thorium fluoride ($ThF_4$) and zinc selenide (ZnSe). The low tensile stress of $ThF_4$ makes it compatible with ZnSe and other such compounds. These coatings are commercially available as "beamsplitters", for instance from Laser Research Optics of Providence, R.I. Both the $ThF_4$ layers and the ZnSe layers in these beamsplitters are about 10 to 1000 nanometers in thickness. Thorium fluoride is well known to be useful as a component in mulitlayer coatings for AR, bandpass, and dichroic filters. These bandsplitter coatings can provide transmittance of up to 98.5% throughout the 7~14 micron wavelength range.

In the present invention, the radiation other than that having wavelengths of 7~14 microns is imaged to the back of the prism surface by imaging optics (e.g., including a flat mirror and a parabolic mirror), at which point "other" radiation heats the phase change material. This is depicted in FIG. 3. Heating is generally done by visible and near-infrared wavelength radiation. This imaging can be done one to one, so that a pixel from the signal light and radiation light are recombined to the same location on the phase change thin film material. In this process, the LWIR and visible/near infrared radiation are separated at the first surface by the beam splitter coating. The LWIR is reflected by the second surface (the $VO_2$ surface) onto a detector surface. The visible/near infrared radiation is imaged to the same detector surface. When the optics are configured to provide the visible/near infrared radiation as a 1:1 image, the visible/near infrared radiation will combine with the LWIR perfectly, forming the same image that would have been formed in the absence of radiation beam splitting.

The LWIR optical limiter device of the present invention is broadband, covering the whole LWIR region. In this invention, the signal is reflected from the surface of phase change (or refractive index change) material, instead of going through it. Thus the loss through the present LWIR limiting device under normal condition is low compared to the loss with a transmission type device. In accordance with this invention also, radiation other than that of the signal wavelengths of interest heats the phase change material directly from the back. Thus the heating process is more effective. The LWIR optical limiter of this invention is a true passive device, but nonetheless it provides a quick response. Being composed principally of two thin layers, it is small, compact, and light. The LWIR optical limiter of this invention works for continuous wave incident light.

The present invention is described as a broadband infrared limiting prism. The description provided hereinabove, however, is merely illustrative of the application of the principles of the present invention, the scope of which is to be determined by the following claims viewed in light of the above specification. Other variants and modifications of the present invention will be readily apparent to those skilled in the art.

What is claimed is:

1. A mid-wave infrared radiation (mid-IR) and long wave infrared radiation (LWIR) limiter Total Internal Reflection (TIR) device, said device comprising:

a prism;

a thin film coated on a surface of said prism; and a broad band interference filter configured to separate radiation of a desired wavelength from radiation of other wavelengths, wherein the materials making up said prism and said thin film are selected so that, in the presence of radiation having an intensity less than a certain threshold, the refractive index of the thin film differs from the refractive index of the prism.

2. The mid-wave infrared radiation and long wave infrared radiation limiter Total Internal Reflection device of claim 1, comprising:

a prism;

a thin film coated on a surface of said prism; and a broad band interference filter configured to separate radiation of a desired wavelength from radiation of other wavelengths, wherein the materials forming the prism and the thin film are selected so that, in the presence of radiation having an intensity less than a certain threshold, the refractive index of the thin film is lower than that of the prism, and when the radiation has an intensity higher that said certain threshold, the refractive index of the thin film is higher than that of the prism.

3. The device of claim 2, wherein said prism is composed of gallium arsenide (GeAs) or germanium (Ge).

4. The device of claim 2, wherein said thin film is composed of material which changes phase from semiconductor to metal when heated.

5. The device of claim 4, wherein said thin film is composed of vanadium dioxide ($VO_2$).

6. The device of claim 2, wherein said broadband interference filter comprises layers of thorium fluoride ($ThF_4$) and zinc selenide (ZnSe).

7. The device of claim 2, further comprising means to image the radiation of other wavelengths to the back side of said prism for heating said thin film from the back side of the prism.

8. The device of claim 7, wherein said means to image the radiation of other wavelengths to the back side of said prism comprises imaging optics.

9. The device of claim 7, wherein the radiation of a desired wavelength is radiation of 3 to 14 microns.

10. The device of claim 7, wherein the radiation of a desired wavelength is radiation of 7 to 14 microns.

11. The mid-IR and LWIR limiter Total Internal Reflection device of claim 1, wherein said device comprises a prism having a thin film coated on the back surface of said prism, and a broad band interference filter configured to separate radiation of a desired wavelength from radiation of other wavelengths, the materials making up said prism and said thin film being selected so that, in the presence of radiation having an intensity less than a certain threshold, the refractive index of the thin film is higher than that of the prism, and when the radiation has an intensity higher that said certain threshold, the refractive index of the thin fun is lower than that of the prism.

12. The device of claim 11 comprising:

a germanium prism having a front plane boundary surface and a back plane boundary surface;

a layer of vanadium dioxide applied to the back plane boundary surface;

a broad band interference filter coating comprised of layers of thorium fluoride and layers of zinc selenide applied to the front plane boundary surface;

a waveguide for guiding incident electromagnetic radiation from a source external to the device onto the broad band interference filter, whereby electromagnetic radiation having wavelengths in the range 3 to 14 microns passes through the broad band interference filter and the front plane boundary surface of the prism into the body of the prism and reflects off of the back plane boundary surface of the prism onto a detector located outside of the prism; and means for guiding electromagnetic radiation having wavelengths outside of the range 3 to 14 microns from the broad band interference filter onto the back plane boundary surface of the prism without passing through the body of the prism, whereby the electromagnetic radiation having wavelengths outside of the range 3 to 14 microns heats the vanadium dioxide layer.

13. The device of claim 12, wherein the electromagnetic radiation which heats the vanadium dioxide layer is radiation in the visible and near-infrared portion of the electromagnetic spectrum.

14. The device of claim 11 comprising:

a germanium prism having a front plane boundary surface and a back plane boundary surface;

a layer of vanadium dioxide applied to the back plane boundary surface;

a broad band interference filter comprised of layers of thorium fluoride and layers of zinc selenide applied to the front plane boundary surface;

means for guiding incident electromagnetic radiation from a source external to the device onto the broad band interference filter, whereby electromagnetic radiation having wavelengths in the range 7 to 14 microns ("LWIR") passes through the broad band interference filter and the front plane boundary surface of the prism into the body of the prism and reflects off of the back plane boundary surface of the prism onto a detector located outside of the prism; and means for guiding electromagnetic radiation having wavelengths outside of the range 7 to 14 microns ("non-LWIR") from the broad band interference filter onto the back plane boundary surface of the prism without passing through the body of the prism, whereby the non-LWIR heats the vanadium dioxide layer.

15. The device of claim 14, wherein the electromagnetic radiation which heats the vanadium dioxide layer includes radiation in the mid-infrared portion of the electromagnetic spectrum.

* * * * *